W. DIEMER.
PERAMBULATOR.
APPLICATION FILED MAR. 6, 1911.
1,119,140.
Patented Dec. 1, 1914.
2 SHEETS—SHEET 2.
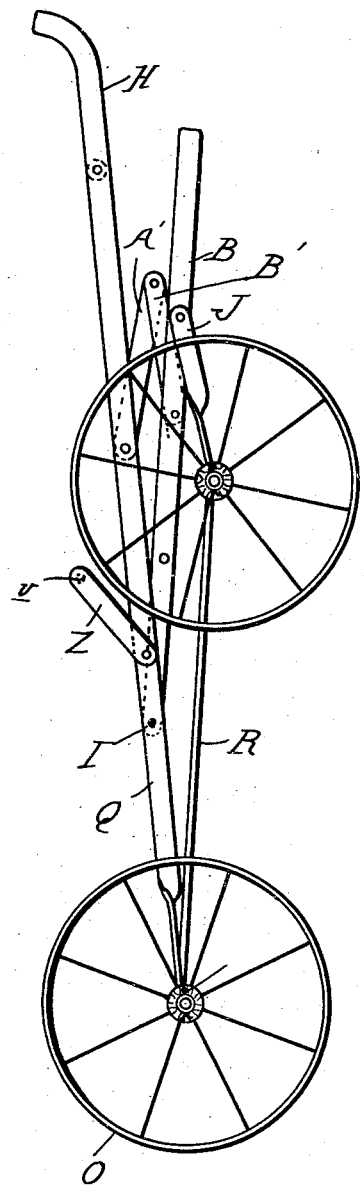
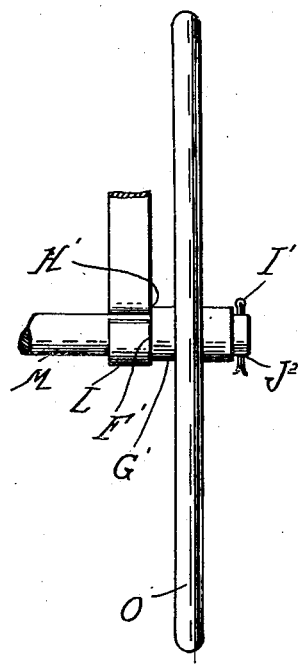
Witnesses
Inventor
William Diemer

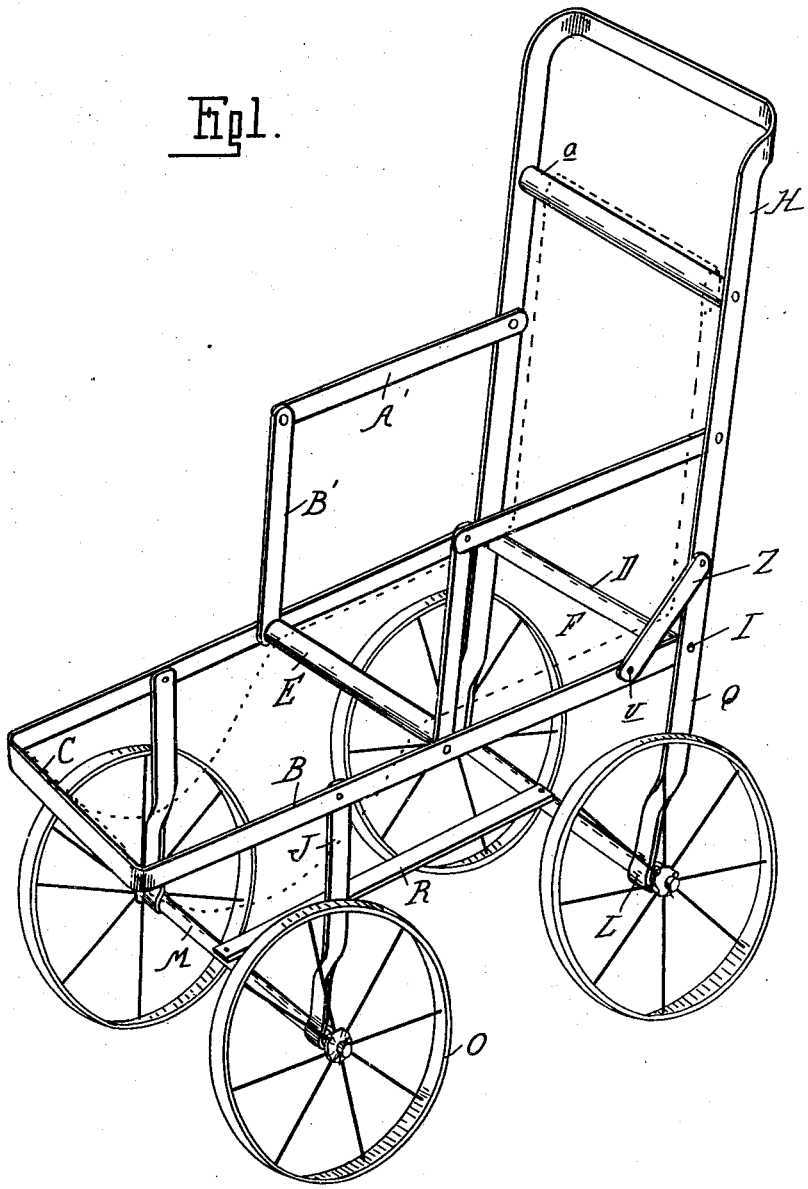

UNITED STATES PATENT OFFICE.

WILLIAM DIEMER, OF TOLEDO, OHIO, ASSIGNOR TO GENDRON WHEEL COMPANY, OF TOLEDO, OHIO, A CORPORATION OF OHIO.

PERAMBULATOR.

1,119,140.  Specification of Letters Patent.  Patented Dec. 1, 1914.

Application filed March 6, 1911. Serial No. 612,645.

*To all whom it may concern:*

Be it known that I, WILLIAM DIEMER, a citizen of the United States of America, residing at Toledo, in the county of Lucas and State of Ohio, have invented certain new and useful Improvements in Perambulators, of which the following is a specification, reference being had therein to the accompanying drawings.

My invention relates to folding or collapsible perambulators, the invention residing in the peculiar construction, arrangement and combination of the various parts as more fully hereinafter described and as pointed out in the claims.

In the drawings: Figure 1 is a perspective view of a perambulator embodying my invention; Fig. 2 is a side elevation thereof with the parts folded, the back, seat and foot-rest being omitted; and Fig. 3 is a front elevation of a portion of one of the axles, showing the connecting link and wheel.

At the present time collapsible children's carriages are largely made with wheels which fold into parallelism with the main frame, this folding being effected by the folding downward of the handle. While this makes a compact folded structure it tends to complicate construction and requires that the device be lifted bodily and its entire weight held in the hands of the operator while folding; nor can the wheels be utilized in the folded position as a support on which to move the device.

My construction is intended to simplify the construction, reduce the weight and cost and in folding to have the wheels stand in their original relation to the frame, that is, so that they can be used as a support upon which to wheel the folded device.

To this end my invention comprises a main or seat frame; a rigid axle frame to which the wheels are fixedly journaled; links pivoted to the two frames; and a handle which is so connected that its folding will bring the axle and main frames together, leaving the wheels in their original relation to the axle frame.

The seat frame comprises two side-bars B, connected by suitable cross-bars C, D, E. The axle frame comprises the two axles M, connected by one or more connecting rods R, the axles M at their ends having suitable spindles upon which are journaled the wheels O. Links, J, are pivoted at their upper ends to the side-bars B, toward the front, and in this construction (which shows the links of metal strips) are given a half-twist and, at their lower ends, formed into eyes L which encircle the axle. These links as shown are inside the wheels and the planes of the wheels are outside the side-bars B. At the rear are the links Q connecting the rear axle and the rear end of the frame.

H is the handle, which I have here shown as formed of a V-shaped metal bar, the connecting bar at the top and the lower ends of the two limbs being formed integral with or secured to the links Q. The pivot I, which pivotally connects the tops of the links Q to the side-bars, acts as the pivot for the handle.

I preferably employ a seat side-frame which I have here shown as comprising the seat side-bars A' pivoted at their rear ends to the handle, and at their forward ends to the uprights B', which latter are pivoted to the side-bars. I employ a lock to hold these pivoted frames in their extended position, and have shown such lock in the form of diagonal braces Z of spring metal pivoted at one end to the handle and having at the other end pins $u$ adapted to enter holes in the side-bars.

Any form of seat, back and foot-rest may be employed, that here shown being suitable for a collapsible doll's carriage, consisting of a flexible covering F secured at the top to a cross-bar $a$ of the handle, hanging down to the rear cross-bar D to which it may be tacked, extending forwardly over the cross-bar E, and with a depressed foot-rest portion forward of the bar E, being secured at its forward end to the cross-bar C.

The parts thus constructed are adapted to be operated as follows: On disengaging the pins $u$ of the braces Z the carriage can be collapsed by taking hold of the front cross-bar and the handle and moving them toward each other. The handle swings the rear links Q upward and through the connecting bar R the front links are swung upwardly (the eyes L turning on the axles in this movement); thus bringing the handle and the main or seat-frame into substantial parallelism and moving the axle frame near to or up against the underside of this frame, as shown in Fig. 2.

In order to prevent longitudinal movement of the axle M in relation to the bearings L the inner face F' of the wheel hubs G' are positioned so as to have a thrust bearing upon the outer faces H' of the bearings L and the wheels are held against displacement in the opposite direction by cotter pins I' engaging apertures J² in the axles, as shown in Fig. 3.

What I claim as my invention is:

1. In a collapsible perambulator, the combination with the main frame, including spaced side bars, a front pair of links projecting below the main frame and pivoted respectively to said side bars to turn longitudinally of the frame about a horizontal axis, a bail-shaped handle having the sides thereof similarly pivoted to the side bars and having rigid portions extending below the main frame, said front links and the lower portions of the handle being provided with bearing portions, axles respectively carried by the bearing portions of the front links and handle, the axles having their ends projecting beyond the respective bearing portions, front and rear wheels journaled on said extensions, and a connection between said axles for holding the same a fixed distance apart in all positions of adjustment.

2. In a collapsible perambulator, the combination with the main frame including spaced side bars, a front pair of links projecting below the main frame and pivoted respectively to said side bars to turn longitudinally of the frame about a horizontal axis, a bail-shaped handle having the sides thereof similarly pivoted to the side bars and having rigid portions extending below the main frame and forming rear links, said front and rear links being formed of flat metal twisted to position the flat faces of the lower portions thereof at substantially right angles to the upper portions of the links, said lower portions terminating in bearings, axles respectively carried by the bearing portions of the front and rear links, the axles having their ends projecting beyond the respective bearing portions, front and rear wheels journaled on said extensions, and a connection between said axles for holding the same a fixed distance apart in all positions of adjustment.

In testimony whereof I affix my signature in presence of two witnesses.

WILLIAM DIEMER.

Witnesses:
ADELAIDE I. ADAMS,
JAMES P. BARRY.

Copies of this patent may be obtained for five cents each, by addressing the "Commissioner of Patents, Washington, D. C."